United States Patent [19]

Ryan et al.

[11] Patent Number: 4,702,817
[45] Date of Patent: Oct. 27, 1987

[54] REMOVING HAZE FROM HYDROCARBON OIL MIXTURE BOILING IN THE LUBRICATING OIL RANGE

[75] Inventors: Douglas G. Ryan, Rockaway; Steven Ackerman, Denville, both of N.J.

[73] Assignee: Exxon Research and Engineering Company, Florham Park, N.J.

[21] Appl. No.: 789,391

[22] Filed: Oct. 21, 1985

[51] Int. Cl.⁴ .................................................. B03C 5/00
[52] U.S. Cl. .................................... 208/28; 204/188; 204/190
[58] Field of Search .................. 208/28, 190; 204/186, 204/188, 302, 308, 191, 181.8

[56] References Cited

U.S. PATENT DOCUMENTS

| | | | |
|---|---|---|---|
| 1,940,654 | 12/1953 | Stanton | 204/181.8 |
| 2,031,214 | 2/1936 | Fisher | 204/181.8 |
| 2,042,887 | 6/1936 | Fisher et al. | 204/181.8 |
| 2,107,771 | 2/1938 | Wade | 204/181.8 |
| 3,269,931 | 8/1966 | Darby et al. | 204/188 |
| 3,412,002 | 11/1968 | Hubby | 204/180.1 |
| 3,489,669 | 1/1970 | Ruhnke | 204/302 |
| 3,567,619 | 3/1971 | Brown | 204/302 |
| 3,616,460 | 10/1971 | Watson | 204/302 |
| 4,139,441 | 2/1979 | Boje | 204/191 |
| 4,194,956 | 3/1980 | Seguine | 204/181.8 |
| 4,255,777 | 3/1981 | Kelly | 239/704 |
| 4,469,582 | 9/1984 | Sublette et al. | 204/308 X |
| 4,581,112 | 4/1986 | Mintz et al. | 204/188 |
| 4,622,119 | 11/1986 | Cerkanowicz et al. | 204/190 |
| 4,627,901 | 12/1986 | Ryan et al. | 204/188 X |

*Primary Examiner*—Andrew H. Metz
*Assistant Examiner*—Glenn Caldarola

[57] ABSTRACT

Haze in lube oil is firstly precipitated as wax and ice crystals to form a slurry which is introduced, through inlet (18), into a separation vessel (15) containing a bed of packed aggregate (20) which preferably comprises wax balls, or asphalt or ice chunks. The slurry is indirectly charged with free excess charge which is net unipolar by means of a charge injector 11. The injected charge causes the wax and ice crystals to be electrically driven to and deposited on the aggregate. Periodically, the wax and ice-soiled aggregate is replaced by fresh aggregate and the soiled aggregate can be supplied as feed to a conversion process, which can for example be a catalytic cracking process.

24 Claims, 2 Drawing Figures

REMOVING HAZE FROM HYDROCARBON OIL MIXTURE BOILING IN THE LUBRICATING OIL RANGE

BACKGROUND OF THE INVENTION

This invention relates to methods and apparatus for removing haze from hydrocarbon oil mixture boiling in the lubricating oil range. Throughout this specification, it is to be understood that "hydrocarbon oil mixture" and "oil mixture" both means a hydrocarbon oil mixture boiling in the lubricating oil range.

The problems of wax in lubricating oil are very well known in the art. In the distillation of crude oil, a proportion of wax is present in cuts taken in the lubrication oil range. Some of the wax remains dissolved in the oil, whereas other fractions form a haze as the oil fraction ages at ambient temperatures. Wax in itself is in fact a good lubricant but under comparatively low temperatures such as engine cold start conditions, its presence causes the oil to be thick and viscous and as a result the engine may be hard to turn over at sufficient speed during starting. In addition, wax haze or particulate matter can lead to plugging of the engine oil filter. Haze manifests itself as a milky or cloudy appearance in the oil and is often caused by wax or by both wax and tiny water droplets being present in the lubricating oil. Typically a minimum of about 0.1% by volume of wax will cause some lubricating oil to look hazy. Therefore the existence of haze caused by the presence of wax crystals or particles detrimentally affects the performance of lubricating oils.

Techniques have been available for many years which enable dissolved wax to be separated from lubricating oil. A well-known approaah is to mix an oil solvent with the lubricating oil, chill the mixture to precipitate wax crystals, and separate the wax from the resulting slurry by settling or filtration. "Oil solvent" as used throughout this specification refers to those solvents which when added to an oil mixture result in a lower viscosity for the solvent-oil mixture than for the oil mixture alone. Viscosity reduction is beneficial for enhancing the settling or filtration processes used to separate the precipitated wax from the solvent/oil. Usually, the oil solvent will have the additional property of having a higher solubility for the oil (hydrocarbon oil mixture) than for the wax at any given temperature, so that during chilling of the solvent-oil mixture to precipitate wax, the wax precipitation is enhanced. Liquified hydrocarbon alkanes or alkenes, ketones, toluene or other aliphatics, and light organic chlorides are examples of well known oil solvents. When the wax-laden oil is cooled, then as the temperature of the oil is reudced, different wax fractions start to come out of solution, aided by the oil solvent. Propane is an example of a preferred oil solvent because in addition to its oil solvent properties, it boils or vaporizes at typically encountered conditions of temperature and pressure in propane dewaxing processes, and this in turn leads to an auto-refrigeration effect which can be used to bring about the desired cooling, at least in part, of the wax-laden oil.

The grown wax particles and crystals are separated from the lubricating oil/oil solvent mixture, following the above described propane pretreatment, by means of a suitable mechanical filter. Rotary drum filters are well-known in the art for this purpose. The lubricating oil/oil solvent mixture is brought into contact with a filter cloth, extending around the rotary filter drum, in one angular position of the filter drum and a wax cake is formed on the filter cloth. In another angular position, the wax cake is washed with a solvent to recover oil from the wax cake and in a further angular position of the rotary filter drum, wax is scraped from the filter cloth by a scraper or "doctor" blade positioned adjacent the periphery of the rotary filter. The thereby-resulting relatively wax-free cloth then rotates further into contact with the wax-laden mixture of oil and solvent again to collect more wax and this process continues. Since the rate of filtration is directly related to the viscosity of the lube oil/oil solvent mixture, which is lower than that of the lube oil alone, the filtration rate is enhanced.

The wax particles need to be grown as large as possible in the oil solvent pretreatment process, in order to achieve the most effective wax separation by the rotary filters. This requires that the temperature of the wax-laden lubricating oil be reduced very gradually (typically around 2° C. per min.). If the temperature were to be reduced more rapidly, much smaller wax crystals would be produced for a given temperature drop. Therefore, the oil solvent pretreatment apparatus has to be specifically designed to provide the necessary stringent operating parameters. In addition, dewaxing aids are often used to promote the wax crystallation.

After removal of wax in the rotary drum filter the dewaxed lube oil (DWO) and oil solvent admixture are in general processed in a solvent recovery plant which recovers the oil solvent from the admixture, leaving DWO which is accumulated in oil storage tanks.

The approach to lube oil dewaxing described above is well known and widely used in the effective and economical dewaxing of lube oil. However, recent developments in the electrical separation field have led to new dewaxing techniques which appear to be promising. For example, U.S. patent application Ser. No. 722163 filed on the Apr. 17, 1985 in the name Ryan et al and assigned to the present assignees relates to separating wax particles from hazy lube oil by introducing free excess charge into the oil (for example by injecting charge into the oil by field emission from a sharply pointed, high potential, electrode) and bringing the charged oil into contact with at least one collector surface on which wax particles agglomerate. For collecting the wax in this way, the charged oil may be passed into a separation vessel containing a bed of densely packed beads of low electrical conductivity so that the wax agglomeration takes place in the bed on the bead surfaces and wax deposits build up on the beads. After a while, the wax deposits are sufficiently large that the separation efficiency diminishes so that it becomes necessary to replace the beads with fresh ones, remove the existing beads to clean them before returning them, or regenerate the beads in situ. Lube oil dewaxing is important not only for separating wax from the oil but also because the wax in itself is a useful product which can be sold or treated further, for example in a catalytic cracker, to produce further petroleum products. Therefore, it is wasteful to dispose of the wax-soiled beads because of the intrinsic value of the wax and in any case the cost of the beads themselves is not insignificant. On the other hand cleaning the beads is costly and when using a solvent wash to do this as is known in the art, the solvent removes the wax from the beads but the solvent has to be removed from the wax. If the beads are regenerated in situ, then there is the added disadvantage of downtime of the dewaxing apparatus. The present invention employs the same electrical separation method and apparatus as the aforesaid Ryan et al application but employs novel means to achieve an improvement in the respects discussed above.

DESCRIPTION OF THE PRIOR ART

The following U.S. patents are of background interest to the present invention. U.S. Pat. No. 4,139,441 (Bose) discloses in Example 4 thereof an electrofilter for removing floc wax from a lube oil. The feed oil is subjected, in a chamber, to an electrostatic field of oscillating intensity before being subjected, in a separation zone containing a bed of packed beads of glass or ceramic, to an electrostatic field of unidirectional polarity.

In U.S. Pat. No. 4,194,956 (Seguine), a process for dewaxing vegetable oils comprises chilling the oil to produce wax crystals and then filtering through a bed of packed ceramic beads in the presence of a high gradient electrostatic field maintained across the bed.

U.S. Pat. No. 3,269,931 (Darby et al) discloses removing water haze from a mineral oil by passing the oil through a charged electrode structure while dispersed water droplets are coalesced and settle downwardly to the bottom of apparatus to be removed.

U.S. Pat. No. 2,039,636 (Dillon et al) discloses a process for dewaxing oil. The oil is mixed with a diluent and chilled to precipitate wax. The chilled mixture is then subjected in an electric treater to an electric field to cause some of the wax to be deposited on the electrodes of the treater. The wax which does not deposit on the electrodes is agglomerated so as to be more readily filtered, centrifuged or settled.

Finally, reference is directed to U.S. Pat. No. 4,255,777 (Kelly), assigned to the present assignees. This patent specifically discloses an electrostatic atomizing device and process for the formation of electrostatically charged droplets having an average diameter of less than about 1 millimeter for a liquid having a low electrical conductivity. Envisaged applications of the electrostatic atomizing technique are for spraying cleaning fluid onto the surface of an article to be cleaned, for spraying agricultural liquid, such as an insecticide, onto vegetation or soil, for spraying lubricant onto bearings and gears of large industrial machinery, for surface coating an article by spraying a solution of a plastic dissolved in a non-conductive liquid or an oil-based paint, to inject free excess charge into a molten plastic, glass or ceramic, and for spraying liquified plastic material for forming surface coatings. Another possible application is to produce charged droplets of liquid e.g. paint within a body of the same liquid which is in contact with a metal surface, so that the charged droplets deposit as a coating on the metal surface. Charged droplets of for example perfume could be sprayed onto oppositely charged powder e.g. talcum powder. Yet another application is the atomization of hydrocarbon fuels, for increasing combustion efficiency. However, the Kelly patent neither discloses nor suggests trying to charge a two-phase liquid comprising dispersed or suspended particles such as wax in a continuous liquid phase (such as lubricating oil) nor appreciates that the charge, introduced into the continuous liquid phase, transfers therefrom to the dispersed phase and that an electrophoretic effect occurs which causes migration of the dispersed phase in the liquid phase, nor even suggests any kind of application to electrical separation.

SUMMARY OF THE INVENTION

In order to remove wax and ice crystals from a hydrocarbon oil mixture boiling in the lubricating oil range, according to the invention at least one collector element comprising either hydrocarbonaceous material or water in the solid state (or ice) is positioned in a separation region in a separation vessel. Free charge which is net unipolar is introduced into the hydrocarbon oil mixture either directly, or indirectly via a charge carrier fluid, in such manner as to cause the hydrocarbon oil mixture to act as a medium through which volumetric distribution of the introduced charge takes place. The charged hydrocarbon oil mixture is passed into the separation region and into contact with the collector element(s). Sufficient charge is introduced that the volumetric charge distribution causes wax and ice crystals to be driven to and deposited on the collector element(s).

Preferably, a plurality of collector elements is used, the collector elements being in the form of a bed of packed aggregate of hydrocarbonaceous material or water in the solid state. The term "aggregate" is not meant to impose any limitation on the shape of the individual collector elements or the variation and distribution of sizes. However, the mean size of the individual collector elements forming the aggregate should preferably lie within a preferred range since if the elements are too large, the interstitial spaces tend to be large too with resulting diminution of separation efficiency, whereas if they are too small (i.e. small interstitial spaces), the bed of aggregate can quickly start to become clogged, leading to reduced separation effectiveness and high pressure drop. Preferably, therefore, the mean size of the elements of the aggregate lies in the range about 0.01 cm. to about 15 cm.

The wax collected in any dewaxing plant is a valuable product. Normally that wax is recovered and then processed further, for example, in a catalytic converting or cracking unit. However, that requires firstly separating the collected wax from the filter medium or other collector surface(s) used for collecting the wax which is time-consuming and costly. According to the invention, periodically, the aggregate soiled with the wax and ice crystals thereon is replaced by fresh aggregate (i.e. aggregate which is free of wax and ice deposits) and the soiled aggregate is supplied as feed to a conversion process. Example of such conversion processes are catalytic cracking and combustion. Because the aggregate comprises hydrocarbonaceous material or water in the solid state, there is not generally any need to separate the deposited wax from the aggregate. The wax and aggregate are merely processed together. The aggregate may comprise wax balls or asphalt or ice chunks (i.e of random size and shape). "Asphalt" as used herein to define one preferred material from which the collector elements can be made refers to petroleum asphalts (as opposed to coal tar pitches or natural asphalts), and specifically to vacuum residua. According to one example, when wax balls are used, the wax balls soiled with wax and ice deposits and removed from the apparatus can be fed to a catalytic converter unit for conversion to desirable hydrocarbon products.

When removing at least wax haze from a hydrocarbon oil mixture, the haze typically containing micron, or larger-, sized wax paticles and dissolved wax, the solubility of the oil mixture for the wax is reduced to precipitate at least wax crystals which are then removed by the separation method according to the invention disclosed above. One way of reducing the solubility of the oil mixture for wax is to admix an oil solvent with the wax haze-containing oil mixture. Another way is to reduce the temperature of the oil mixture. Preferably, for removing wax and water haze, the temperature reduction is sufficient to precipitate crystals of wax and water in the solid state and then the crystals are removed by the separation method according to the invention. It is especially preferred to combine the beneficial effects of using an oil solvent and of temperature reduction, by employing a vaporizable liquid as the oil solvent and causing a proportion of the oil solvent liquid to vaporize to produce self-cooling of the admixture of oil solvent and oil mixture, so as to effect the required temperature reduction. By way of example typical filtration temperatures (i.e. in the packed aggregate bed) are $-30°$ F. in propane dewaxing and $0°$ F. in ketone dewaxing. In both cases, fine water droplets in the lube oil will be converted to ice crystals in the chilling of the lube oil.

Other ways exist to alter the solubility of the wax in the hazy oil mixture. To hazy oil mixture already diluted with an oil solvent liquid can be added a liquid additive which alters the chemical or physical properties of the solvent by chemical reaction between the additive and solvent or, where the additive is a solvent absorber, by the selective absorption of the solvent by the additive. A second example is to utilize the vapor pressure of the oil mixture such as by venting or drawing vacuum to effect temperature reduction. Alternatively, oil solvent vapor in the gas or vapor atmosphere above a body of oil solvent/lube oil can be selectively removed from the atmosphere to bring about wax precipitation, for example using a flash drum.

It is to be noted that wax and lube oil are chemically similar but have differing molecular weights. To facilitate precipitation of dissolved wax, an additive may be used such as a high molecular weight hydrocarbon, containing an amine group.

Preferred oil solvents for separating wax from a hazy hydrocarbon oil mixture include liquid propane or a liquid alkane (e.g. hexane) or alkene whose molecular weight is between 16 and 114, or any other oil solvent whose electrical conductivity is less than about $10^{-8}$ (ohm .m)$^-$. The temperature of the hazy lube oil may be in the range $140°$ F. to $200°$ F. for example, before it is mixed with the oil solvent liquid whose temperature is in the range of $60°$ F. to $200°$ F., typically. These temperature ranges help to ensure that the oil solvent dissolves thoroughly and readily in the oil mixture.

The free charge introduction can be effected directly into the usually chilled, solvent-diluted hazy oil mixture but with preferred kinds of free charge introduction devices to be described hereinbelow, the wax and ice crystals in the solvent-diluted oil mixture are liable to cause clogging in the free charge introduction device or short-circuiting. Preferably, therefore, the free charge is introduced into a charge carrier fluid, devoid of any dispersed solids or particles, which is then combined with the chilled, solvent-diluted oil mixture, whereby the charge is volumetrically distributed within the continuous phase comprising the solvent, oil mixture and carrier fluid and transfers to the wax and ice crystals present. preferably, the charge carrier fluid comprises a recycled proportion of the substantially wax and ice crystal-free solvent-diluted oil mixture remaining after collection of the wax and ice crystals on the bed of aggregate or other collector element(s). Alternatively, the charge carrier fluid may comprise an oil solvent liquid, which for convenience can be the same solvent as used to dilute the hydrocarbon oil mixture.

So far as the free charge introduction is concernd, it is particularly preferred, according to the present invention, that it is performed at least predominantly by electron emission, in such manner as to cause the oil mixture (usually admixed with oil solvent liquid) to act as a medium through which volumetric distribution of the introduced charge takes place. The volumetric charge distribution causes both an electric field to be induced in the oil mixture and the particles causing haze in dispersed phase form to become charged, and the induced electric field and the charge on the dispersed phase interact to produce the electrical driving force acting on the dispersed phase. The nature of the electron emission will be discussed in detail hereinbelow. In the description which follows, for simplicity the direct charge introduction method is described, but it will be appreciated that essentially the same description applies where a charge carrier fluid such as solvent-diluted dewaxed oil or oil solvent is used, except that the charge introduced into the carrier fluid becomes volumetrically distributed therein and, after contacting the solvent-diluted waxy oil to be charged, is then volumetrically distributed in the carrier fluid/solvent-diluted oil mixture, which results in charge transfer to the wax and ice crystals present. These are then driven to and deposited on the collector elements of the aggregate in the same way as when the direct charging technique is employed.

Free excess charge introduced into the wax/water containing oil mixture is positive or negative ions which, initially, are free to move through the solvent-diluted oil mixture. It is stressed that the electric field is the result not of any voltage applied to any external electrodes so as to set up an electric field between those electrodes, but rather arises from the total introduced or injected charge distribution in the oil mixture and on the suspension of wax and ice crystals and the collector element surface regions (i.e. the aggregate) where separation (filtration) occurs.

The basis for the effective separation that can be achieved when introducing free excess charge into the chilled, solvent-diluted hazy oil mixture is believed by the inventors to be as follows. The first step in the process is the production of an excess (i.e. net unipolar—positive or negative) charge density in the otherwise electrically-neutral hazy dewaxed oil mixture. Several techniques are available to produce a transient or steady-excess charge density. Broadly speaking, such methods fall into two general categories, namely: (1) injection of excess charge across the interface of boundary which confines the solvent-diluted oil mixture, and (2) volumetric charge introduction techniques into the bulk of the solvent-diluted oil mixture. Examples of the first category include electron beam and high energy particle radiation, photo-emission and charge transport by a moving fluid. Another example is charge injection as taught in U.S. Pat. No. 4,255,777 (Kelly), the contents of which are expressly incorporated herein by reference and which discloses charge injection predominantly or solely by field emission. Electron beam, photoemission and field emission are all examples of electron emission techniques, each of them involving minimal or no ionization effects. Examples of the second category are photoionization of either or both of the wax/ice crystal suspension and the oil mixture and secondary ionization by thermalization of high energy particle irradiation of the chilled hazy, oil mixture and solvent. These examples all involve ionic dissociation within the oil mixture.

It is necessary that there be an excess of free charge in the oil mixture solution in the sense of a sufficient abundance that an effective enhancement of wax separation during filtration will occur. Typically, the density of the free electrons would be of the order of $10^{16}$ charges per $m^3$. A lower limit would be about $1 \times 10^{10}$ charges per $m^3$. A typical preferred range of free charge density is about $1 \times 10^{13}$ to $1 \times 10^{19}$ charges per $m^3$ or even higher, for providing effective enhancement of wax and ice crystal filtration.

The charge introduced into the chilled, solvent-diluted oil mixture to be dehazed must be net negative or net positive. However, providing this requirement is met, then it is equally possible to introduce the excess charge using two streams of opposite but unequal levels of charge or alternating net postiive and net negative streams for the purposes of wax haze agglomeration prior to collection, in the first case, or multilayer deposition on individual elements of the bed of aggregate in the second case (e.g., collecting a net negative layer then a net positive layer, and so forth.)

The next step in the electrical charging process is the transference of the major portion of the excess charge to the precipitated wax haze. In a preferred way of performing the invention in which a charge injector, such as disclosed in the aforesaid U.S. Pat. No. 4,255,777, is used for introducing net unipolar free excess charge into the hazy lube oil (usually with added oil solvent), the charged stream issues from the charge injector as a continuous stream or spray passing through a gas or vapor space inside a separation vessel and onto the surface of a body of charged solvent-diluted oil mixture in the separation vessel, the oil mixture just covering a bed of packed aggregate of wax balls (or asphalt or ice chunks etc.) in a separation region inside the vessel. The gas or vapor space is provided to enable the charged lube oil solution to exit the charge injector with high velocity to efficiently sweep out the injected charge and also to eliminate any charge dissipation path back to the charge injector. Such decoupling of the separation region from the charge injector is important for achieving a high level and high effeciency of charge injection. It is of no particular importance to the effective removal of the haze from the oil mixture whether the charged oil mixture is sprayed by the charge injector or simply issues as a continuous stream through the gas or vapor space, particularly at relatively high velocity throughputs in the charge injector. However, when the haze contaminated lube oil solution is sprayed, the individual oil/solvent droplets are in general separated from one another and this can be important where lower throughput velocities, closer to the drift velocity of the individual charges, are employed.

In the filtration zone (i.e. where the charged spray encounters the chilled, solvent-diluted oil mixture in the separation vessel), by whatever means the free excess charge is introduced into the chilled, solvent-diluted oil mixture, it is assumed that the excess charge density exceeds the solvent/oil mixture background charge density (i.e. the density of bipolar charge carriers which are intrinsic to the solvent/oil mixture and which result in the conductivity of the solvent/oil mixture); then, the induced electric field in the filtration zone caused by the excess charge density will act on the individual charge carriers and drive them towards the boundaries of the solvent/hydrocarbon oil mixture. Some of the charge will be intercepted by the wax particles and/ice crystals forming the haze and the wax particles/ice crystals will thereby become charged. The interaction which then occurs between the charged wax/ice and the induced electric field causes the dispersed wax/ice to migrate towards the boundaries of the oil mixture solution in the separation region, the principal boundaries being the exposed surfaces of the individual elements forming the packed aggregate.

It is mentioned that some wax crystal growth can be expected to arise as a result of migrating wax crystals colliding with one another while in the solvent-diluted oil mixture and sticking together or agglomerating to form larger wax crystals. This effect occurs predominantly where the mean migration path length for the wax particles is large compared with the mean spacing between the individual wax particles. However, due to the short migration paths involved, most wax particles on average will reach the collector elements of the packed aggregate without colliding enroute with other migrating wax particles, so that wax particle deposition and agglomeration occurs principally on the exposed surfaces of the packed collector elements. In practice, a major proportion of direct wax particle deposition on the collector elements coupled with a minor proportion of wax particle deposition on the collector elements following agglomeration within the solvent-diluted oil mixture, will occur. The same growth and deposition mechanism will take effect in the case of the ice crystals present.

It is to be noted that when using a charge injector to introduce the net unipolar free excess charge, it is important that the stream velocity through the charge injector is high enough to transport the charged stream away from the electrode region of the charge injector. Ideally, the stream velocity needs to exceed the drift velocity, relative to the solvent-diluted oil mixture, of the individual charges induced by the electric field produced by the charge injector electrodes. On the other hand, the charged solvent-diluted oil mixture needs to remain in the separation region in the separation vessel long enough to enable adequate wax and ice haze to be collected and separated from the oil mixture in the packed aggregate bed. This generally requires a comparatively long residence time in the separation region and therefore a much lower velocity throughput in the separation region than in the charge injector. A typical value for the throughput velocity in the charge injector might be 1 m/sec whereas the residence time in the separation region might typically be 15 sec. By way of example, in another embodiment the internal cross-sectional diameter of the charge injector orifice diameter might be 0.025 cm, so as to provide a high velocity flow in the region where charge injection occurs. These quoted figures are purely exemplary and have no limiting character.

In order further to explain the nature of the preferred way of charging the chilled, solvent-diluted, hazy lube oil, it is explained that when operating a charge injector, which comprises a pointed high potential cathode electrode and an adjacent anode electrode plate having a spray orifice therein opposite the tip of the pointed electrode (for example as disclosed in the aforesaid Kelly U.S. patent), at cathode voltages below a threshold voltage (sometimes known as a "corona" or "cut-in" voltage) free electrons are field-emitted into the solvent-diluted oil mixture flowing past the pointed electrode and through the orifice in the anode plate. The flow of oil mixture solution sweeps negative free charge downstream from the charge injector while at the same time further free negative charge is field emitted by the cathode and this process takes effect continuously. As the cathode voltage increases (below the threshold voltage), the level of field emission increases.

When the corona threshold is exceeded (but below a breakdown value to be described below), the high potential applied to the cathode produces ionic dissociation in a localised region around the cathode tip. The positive ions in this region or "cloud" are attracted to the surface of the cathode leaving the negative ions which tend to locate themselves more at the downstream side of the cloud. As oil mixture solution flows through the anode/cathode arrangement, the cloud, particularly its downstream side, is swept through the anode orifice while simultaneously fresh oil mixture solution arriving in the region of the cathode tip itself becomes ionised around the cathode tip. Depending on the flow velocity, some of the negative ions travelling in the vicinity of the anode orifice are attracted into the anode representing a sharp increase in the anode current. The remaining charge, swept downstream, comprises both positive and negative ions but with a predominance of negative ions. However, due to ions of opposite polarity cancelling one another out in the downstream region the net negative charge is significantly reduced as compared with the situation when operating at a voltage just below corona threshold (i.e. with field emission).

As the applied voltage increases further towards the breakdown value, the "cloud" expands towards the anode plate. When the breakdown value is reached, the "cloud" bridges the gap between the cathode and anode and dielectric breakdown occurs. The anode current rises to a large value while the level of net charge in the downstream region falls to substantially zero.

From the foregoing description it will be appreciated that optimum charging exists at a cathode voltage which is just below the "corona" or "cut-in" threshold. The charge injector is then operating predominantly or solely by field emission. It will also be appreciated that charging by a corona discharge technique is less desirable since it results in lower levels of charging and hence reduced separation effectiveness in the separation region, whilst if the charging takes place at voltages above the breakdown value, such charging has no beneficial effect on the subsequent filtration. It is also pointed out that when operating below the corona threshold voltage there will generally be little or no ionic dissociation within the solvent/oil mixture. Ways of introducing free excess charge accompanied by little or no ionic dissociation within the oil mixture, apart from by field emission, include electron beam and photoemission techniques, as referred to hereinabove. These and other similar techniques in which only minimal ionization effects occur are included in the term "electron emission", as used in this specification.

Having briefly described the method of this invention, it is pointed out that the invention also finds application to separation apparatus for removing wax and ice crystals from a hydrocarbon oil mixture boiling in the lubricating oil range. The inventive apparatus comprises:

means for introducing free charge which is net unipolar into the hydrocarbon oil mixture in sufficient excess as to produce an electrical driving force acting on the wax on ice crystals; and at least one stationary collector element positioned in contact with said charged oil mixture so that wax and ice crystals are driven to and deposited on said at least one collector element.

When removing wax and water haze from a feedstock of hydrocarbon oil mixture boiling in the lubricating oil range, the inventive apparatus may additionally comprise means for feeding an oil solvent liquid into said feedstock, a mixer for mixing said oil solvent liquid with said hazy oil mixture, to form an admixture, and means for reducing the temperature of said admixure sufficiently to precipitate wax and water haze as wax and ice crystals. When a vaporizable oil solvent liquid is used, said temperature reducing means may comprise a pre-cooling heat exchanger followed by a flash drum for permitting a proportion of said oil solvent liquid to vaporize to produce a refrigeration effect.

According to a preferred embodiment, there is provided apparatus for removing wax and ice crystals from a hydrocarbon oil mixture boiling in the lubricating oil range, comprising a separation vessel including a separation region, at least one stationary collector element positioned in said separation region, said at least one collector element comprising a material selected from the group consisting of hydrocarbonaceous material and water in the solid state, inlet means in the separation vessel for admitting said hydrocarbon oil mixture into the separation vessel so that it comes into contact with said at least one collector element, and means for introducing free charge which is net unipolar into the admitted hydrocarbon oil mixture in sufficient excess that wax and ice crystals in said hydrocarbon oil mixture are driven to and deposited on said at least one collector element. Preferably, the separation vessel comprises an upright cylindrical vessel and said at least one collector element comprises a bed of packed aggregate supported within said separation region which is a central region of the separation vessel, and means for maintaining the level of charged hydrocarbon oil mixture covering said bed of packed aggregate, said inlet means being arranged to direct hydrocarbon oil mixture onto the surface of said charged hydrocarbon oil mixture in said separation vessel and said charge introducing means being positioned inside the separation vessel above and spaced from the level of the charged hydrocarbon oil mixture in the separation vessel, said charge introducing means being arranged to introduce charge into a charge carrier fluid which is directed from the charge introducing means through a gas or vapor space onto the surface of the charged hydrocarbon oil mixture. The bed of packed aggregate is supported on a support member permitting hydrocarbon oil mixture from which wax and ice crystals have been removed to flow through said support member into a lower region inside said separation vessel and the separation vessel is provided with outlet means for hydrocarbon oil mixture from said lower region, there being means for recycling a proportion of that hydrocarbon oil mixture from the outlet means to the charge introducing means so that that hydrocarbon oil mixture serves as said charge carrier fluid.

The description in the present specification refers throughout to the separation of wax and water haze from lubricating oil, which is the objective of the present invention. It will of course be understood that the invention is not selective for removing only wax and ice crystals from lubricating oil, but will also be effective for separating other contaminant particles such as grit, catalyst fines, asphaltene particles, oxide scale, corrosion scale and other corrosion products, coke fines and the like which may also be present with the wax either singularly or in some combination.

BRIEF DESCRIPTION OF THE DRAWINGS

For a better understanding of the invention and to show how the same may be carried into effect, reference will now be made, by way of example, to the accompanying drawings, in which.

DESCRIPTION OF THE PREFERRED EMBODIMENT

Figure 1:
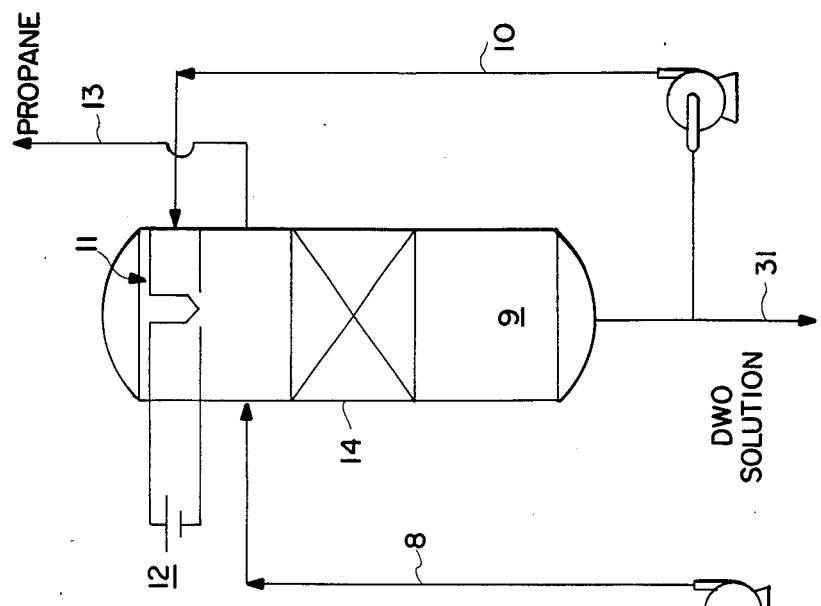
FIG. 1 is a diagrammatic view of one preferred embodiment of the invention.
Figure 1:
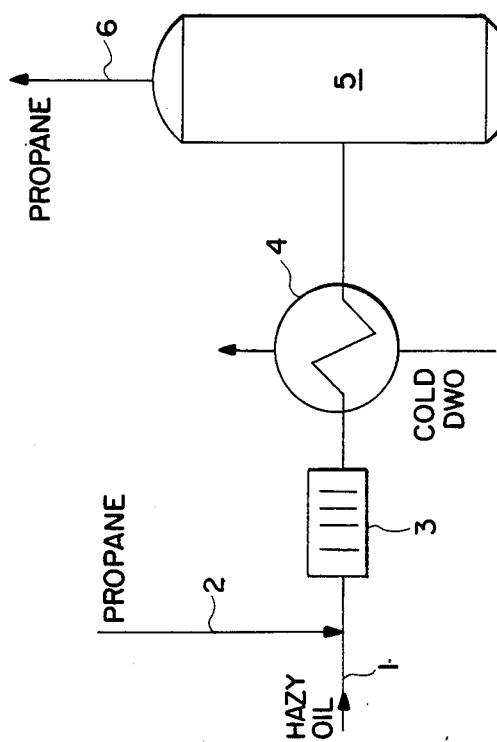

Referring to FIG. 1, there is diagrammatically illustrated a preferred embodiment of the invention for separating wax and water haze from hazy lubricating oil which is introduced along line 1. The oil may have been previously partially dewaxed. The waxy oil feed to be treated typically contains dissolved wax, a proportion of wax particles and crystals and also fine water droplets, all of which would contribute detrimentally to the oil performance, especially under engine cold start conditions, if they were not removed.

Liquid dilution propane at a temperature of 130° F.± about 70° F., flowing along line 2, is added to waxy oil at a temperature of 160° F.± about 40° F. in line 32, those temperature ranges being preferred in order to ensure proper mixing of the propane and waxy oil. By way of example, the temperature of the dilution propane might be about 80° F. for adding to a hazy oil feed at a temperature of approximately 180° F. It is to be understood, however, that the temperature values quoted are purely exemplary and have no limiting character. The propane acts as an oil solvent. The dilution ratio of waxy oil/propane solvent may be about 1.0/3.0 or as required. The propane-diluted hazy oil is then passed into a mixer unit 3 in line 1. The mixer unit may be of any standard construction (e.g. an orifice plate mixer) and serves to thoroughly mix the hazy oil and dilution propane. The diluted waxy oil/propane mixture from mixer 3 is precooled by indirect heat exchange in a precooler 4 with cold dewaxed oil (DWO) solution, which may be recycled DWO from output line 31 of the apparatus. Alternatively, cooling water or other cooling medium may be used in place of the cold DWO solution passed through precooler 4. The precooler reduces the temperature of the propane diluted hazy oil further, typically to about 50°–100° F., and the oil/solvent is then flashed across a single valve in flash drum 5, where sufficient propane vaporizes to reduce the temperature of the wax-laden oil/propane slurry further to the desire dewaxing temperature (dewaxed oil pour minus "spread") which typically might be −30° F. The pressure in the flash drum corresponds to the vapor pressure of propane at that temperature, which for a temperature of −30° F. is about 20 psia. The dewaxing temperature preferably is low enough to produce crystallization of wax having an average particle diameter of about 1 micron or greater. The propane vapor is separated from the slurry in flash drum 5 and leaves the drum along line 6 for recyling to propane recovery unit compression (not shown). The cooling brought about in the precooler 4 and by the auto-refrigeration effect occurring in the flash drum 5, coupled with the lesser solubility of liquid propane to wax causes dissolved wax to solidify and crystallize and form a precipitate in the lube oil/propane solvent. It also converts fine water haze to ice crystals.

The chilled slurry in flash drum 5 is pumped by pump 7 from the bottom of the flash drum along line 8 and introduced into an electrical separator 9, whose construction will be described in more detail hereinbelow with reference to FIG. 2. The separator 9 removes wax and ice crystals from the solvent-diluted wax and ice-containing lube oil in a separation region 14, and dewaxed oil leaves the separator 9 along line 5, from where it can be fed to a propane recovery unit (not shown) and then to tankage and storage. A proportion of the DWO solution in line 31 is recycled through branch line 10 and passed through a charge injector 11, having power source 12, which issues a spray or stream of charged DWO solution onto the propane-diluted, wax and ice-containing lube oil in the separator 9. A propane vapor vent line is indicated by reference number 13. It will be appreciated that FIG. 1 is a simplified diagram omitting certain circuit elements such as flow, pressure and level valves and further pumps (or gravity feed) associated with the lines, flash drum and separator, but the use of these is well known in the art and will not therefore be further described herein.

Figure 2:
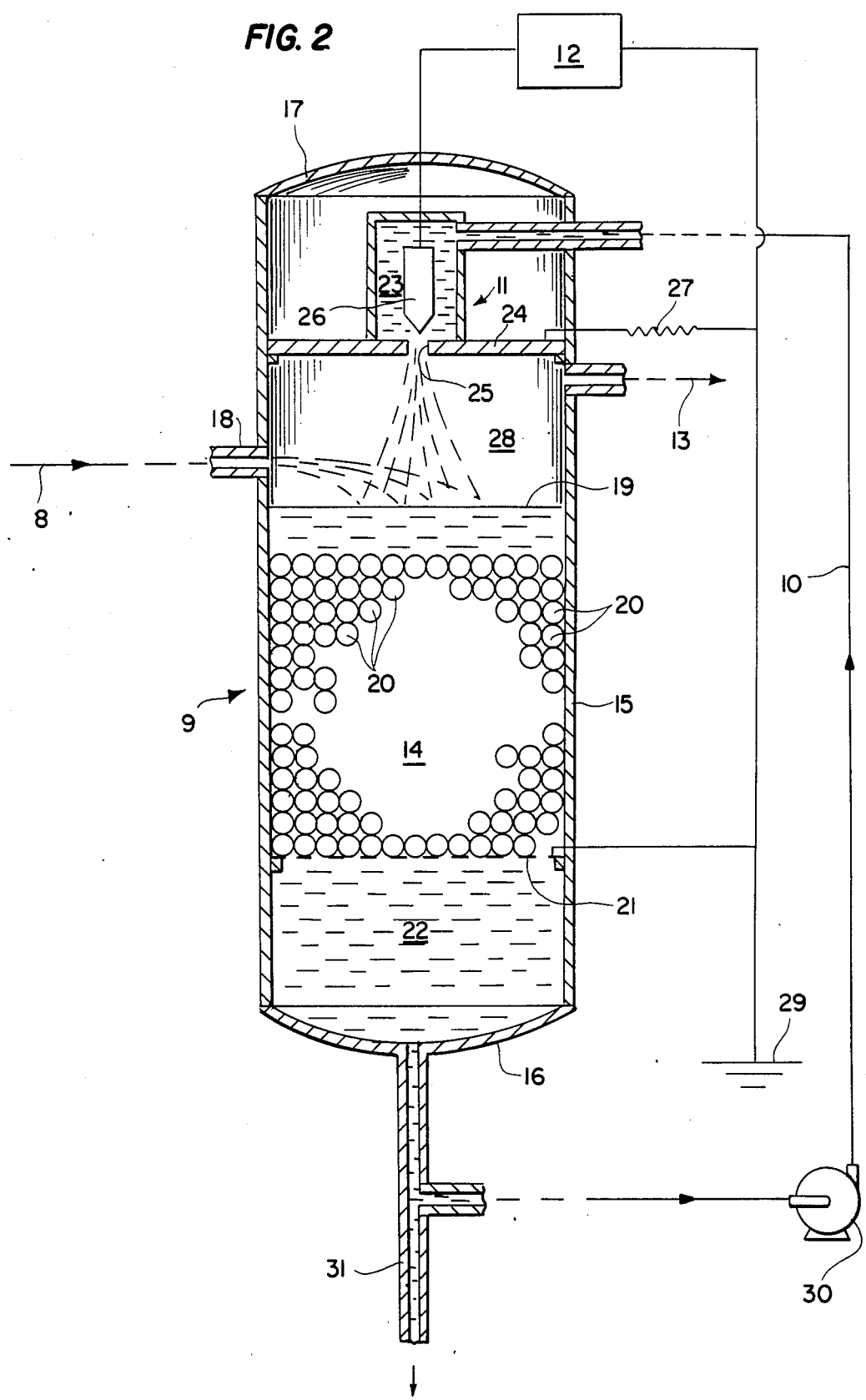
FIG. 2 is a partly simplified and diagrammataic vertical sectional view through an electrical separator included in the embodiment of FIG. 1.

Referring now to FIG. 2, in which the separator is shown in more detail but nevertheless in partly simplified, diagrammatic form, the separator comprises an upright cylindrical vessel 15 made of, or lined with, a material of low electrical conductivity, e.g. glass, rubber, fiber-glass, plastics material, or the like. (so as to minimise charge conduction away from the separator), having a dome-shaped bottom 16 and a dome-shaped top 17. An inlet pipe or nozzle 18 in the side wall of the cylindrical vessel causes the propane-diluted lube oil feedstock pumped from flash drum 5 along line 8 to be sprayed or to stream onto the surface of the oil/solvent mixture in the vessel. Any pressure reduction encountered on flowing through the inlet pipe or nozzle 18 will cause a further small proportion of the propane to vaporize, thereby producing further chilling. The level of the oil/solvent mixture should preferably be controlled within a predetermined tolerance of a preselected level 19 by a level control arrangement (now shown) which may for example comprise a level sensor and a controller which compares the level sensor output with a reference signal and controls a flow control valve in branch line 10 accordingly. The level 19 is set a short distance above the top of separation region 14, in order to keep the wax/ice crystal migration path length to the nearest wax balls to a minimum, but this is not essential.

According to the invention, the separation region 14 is filled with a bed of densely packed wax balls 20 resting on a gauze 21 or the like. As described in more detail hereinbelow, wax crystals and ice crystals collect on the exposed surfaces of the wax balls and in the interstitial spaces between the wax balls, leaving DWO oil/propane which passes through the gauze into the lower region 22 of the separation vessel and exit the separator via line 5. Gauze 21 is made of electrically conductive material and may comprise a metal grid, a metal perforated plate or a metal wire mesh.

The recycled proportion of propane-diluted DWO in the branch line is pumped, by pump 30, into the charge injection chamber 23 of the charge injector 11 which is mounted inside the separation vessel in an upper region thereof. The charge injector in a preferred embodiment may be constructed in accordance with the teaching of the aforesaid Kelly U.S. Pat. No. 4,255,777. Although reference may be made to the Kelly patent for a full description of suitable charge injectors, nevertheless, the main components of the charge injector will now be briefly described herein. As indicated, chamber 23 comprises an upright, suitably cylindrical chamber having a bottom wall 24 with a central opening or orifice 25, and a sharply-pointed electrode 26 positioned inside the charge injector chamber and electrically connected to high voltage power source 12, the tip of the electrode 26 being located closely adjacent to, and in axial alignment with, the opening 25. The chamber bottom wall 24 extends across the entire width of the separation vessel and is mounted at its extremities on the separation vessel wall, so as to support the weight of the charge injector 11. The chamber bottom wall 24 serves as a second electrode which is maintained at a lower voltage, relative to earth, than pointed electrode 26, by means of a connection to earth 12, which can be a direct connection or, as shown in FIG. 2, through a resistance element 27. Free excess charge is injected at least predominantly by field emission from the pointed tip of electrode 26, by the electrode pair 24, 26, into the mixture of DWO and propane solvent, which issues through the orifice 25, and streams or sprays, through enclosed propane vapor space 28, between electrode plate 24 and the surface of the propane-diluted lube oil in the separation region 14, onto the surface of that solvent-diluted lube oil. Propane vapor in vapor space 40, formed by vaporization of propane solvent in the lube oil under suitable conditions of pressure and temperature etc. (e.g. about 20 psia at about −30° F.), is vented and recovered through pipe 13 leading to compression.

The charged stream issuing downwardly through opening 25 may break up from a stream into a spray at a short distance below the opening 25, depending on the charging potential of the charge injector, but the existence of a stream or spray is not critical to the effective operation of the separator. The propane vapor in the separation vessel purges the vapor space 28 of air, which is desirable to avoid risk of explosion or chemical reaction. Where other oil solvent liquids are used which do not vaporize under the prevailing oprerating conditions, e.g. liquid hexane, preferably a purge gas such as nitrogen is circulated through the vapor space 28. This would require a second pipe to be provided extending through the wall of the separation vessel so that that pipe could serve as the purge gas supply pipe and pipe or line 13 would be the purge gas outlet pipe. Where hexane for example is used instead of propane, flash drum 5 would be inappropriate as hexane would not have auto-refrigerant properties and a high capacity refrigerator would be employed in pa=la of precooler 4. Another possibility is for space to be an air space in communication with the ambient atmosphere, but such an arrangement is satisfactory only in situations where there is no risk of explosion or unwanted chemical reaction.

The injector 11 injects free charge of single polarity (positive or negative) into the DWO/propane stream and this stream issues from the injector downwardly through the space 28 onto the surface of the propane-diluted waxy oil in the separation region 14. The spray or stream of solvent-diluted DWO serves as a charge carrier whereby, in the separation vessel, that charge is volumetrically distributed throughout the propane/lube oil mixture and transfers to the dispersed phase present, i.e. wax crystals and ice crystals. The charged wax and ice crystals are caused to migrate within the continuous fluid phase, i.e. propane/lube oil admixture, due to an electrical driving force acting on the wax and ice crystals caused by electrical interaction between the charges on the crystals and the induced electric field set up within the separation region. As a result the wax and ice crystals are electrically driven towards the boundaries of the separation vessel 15 but encounter the wax balls 20 and become attached thereto by a combination of electrical and physical adhesion. By "wax balls" is intended to be conveyed the idea of wax elements of spherical or closely spherical shape. The size of the wax balls is not over-critical but if they are too large, there is a tendency for some of the wax and ice crystals to pass through the bed without separation. On the other hand, if the wax balls are too small, the interstitial spaces between the wax balls are correspondingly reduced in size, which can lead to an unacceptably low throughput rate through the separator and premature clogging of the interstitial spaces by deposited wax and ice. Ideally, the size (diameter) range of the wax balls will lie between the limits about 0.01 cm. and 15 cm., more preferably about 0.03 cm. and 7 cm., and most preferably about 0.1 cm. and 0.4 cm.

As the wax and ice crystals deposit on the wax balls, the wax balls acquire the charge which is slowly conducted through the bed until reaching the conductive electrode 21, from where the charge is conducted to earth 29 to complete the charging circuit of the charge injector.

After a period of use, even with wax balls of a size lying within the preferred ranges quoted, the bed will become clogged with deposited wax and ice and separation effectiveness will diminish noticeably. If low conductivity balls or beads of glass or ceramic for example, as disclosed in the aforesaid U.S. patent application Ser. No. 722163 filed Apr. 17, 1985, were to have been used in place of the wax balls, it would then be necessary periodically to replace the wax and ice soiled beads with new ones or to remove the soiled beads, clean them (for example with a kerosene wash) and then reintroduce them into the vessel 15. Alternatively, the beads may be regenerated or cleaned in situ. All of these techniques are costly, time-consuming or wasteful. According to the invention, however, all that has to be done when using wax balls as the collector elements is to remove them, together with the wax and ice deposits, from the separation apparatus and then use them in whatever way it was intended to use or process the deposited wax, e.g. feed into a catalytic cracker or other conversion unit. Because the wax balls are made of hydrocarbonaceous material which is very similar chemically to the deposited wax, they will in general have no detrimental effect on the catalytic cracking or other processing to which the soiled wax balls are subjected and will be processed along with the collected or deposited wax. In a similar way, ice crystals, although chemically different from wax crystals, will not usually have any detrimental effect when converted to steam (or water) in the catalytic cracking or other processing likely to be used in practice on the separated wax. The prior art glass and ceramic beads on the other hand could not possibly be allowed to be inroduced into a catalytic cracking unit or converter, or the like.

Although it is preferred to use wax balls to form the collector bed, it will be appreciated that hydrocarbonaceous material in general (e.g. coke, coal etc.) may be used instead in accordance with the spirit and scope of the invention as defined by the appended claims. In fact, a particularly preferred alternative to wax balls is asphalt chunks. Furthermore, it is not essential that the particular hydrocarbonaceous material employed be in the shape of balls or approximately spherical elements. The hydrocarbonaceous material forming the bed can be in the form of chunks or pieces or any shape at all, all of which variants are encompassed within the term "aggregate". Preferably, the mean size of the elements forming the aggregate will lie in the size ranges quoted above for the case of wax balls.

According to an important modification, instead of using an aggregate of wax or other hydrocarbonaceous material, ice chunks may be employed instead. As already indicated above, ice (or water or steam) as such is not likely to adversely affect the catalytic cracking or other subsequent processing and for this reason can be used instead of wax or other hydrocarbonaceous material. Alternatively, instead of feeding the soiled ice chunks to a conversion process, the soiled ice chunks or aggregate can be removed from the apparatus and allowed to warm up to melt the ice, leading to easy separation of the collected wax.

It is pointed out that the charging arrangement described in which a proportion of recycled propane-diluted DWO is used as a charge carrying fluid is preferred in that the recycled solvent-diluted DWO is substantially free of wax particles, ice crysals and other fines which, if present, might tend to deposit in the charging region of the charge injector, and adversely affect the charging level, or cause short-circuiting or partial or total blockage. Alternativly, the charge carrying fluid could be liquid propane alone or DWO along. Nevertheless, it is possible to supply the charge 11 injector with the chilled propane-diluted waxy oil from line 8 rather than with recycled propane-diluted DWO, where the potential shortcoming mentioned above can be tolerated.

Finally, it is pointed out that the gauze 21 serves the dual functions of a support member for the wax balls and a grounded electrode completing the charging circuit of the charge injector. In a modification, a grounded gauze or grid-like electrode could be arranged in a horizontal position roughly in the middle of the bed of wax balls and the bed itself would be supported on a separate horizontal gauze in the separation vessel.

What is claimed is:

1. A method of removing wax and ice crystals from a hydrocarbon oil mixture boiling in the lubricating oil range, wherein at least one individual collector element consisting solely of one material, said material being selected from the group consisting of hydrocarbonaceous material and water in the solid state but being distinct from said wax and ice crystals in said hydrocarbon oil mixture, is positioned in a separation region in a separator vessel, free charge which is net unipolar is introduced into the hydrocarbon oil mixture in such manner as to cause the hydrocarbon oil mixture to act as a medium through which volumetric distribution of the introduced charge takes place by free movement of charge through the hydrocarbon oil mixture, and the charged hydrocarbon oil mixture is passed into said separation region and into contact with said at least one collector element, there being a sufficient excess of free charge introduced such that the volumetric charge distribution causes wax and ice crystals to be driven to and deposited on said at least one collector element.

2. A method as claimed in claim 1, wherein said at least one collector element comprises a bed of packed wax aggregate forming a bed.

3. A method as claimed in claim 2, wherein said wax aggregate is in the form of wax balls.

4. A method as claimed in claim 1, wherein said at least one collector element consists essentially of packed asphalt aggregate forming a bed.

5. A method as claimed in claim 1, wherein said at least one collector element consists essentially of packed aggregate of water in the solid state forming a bed.

6. A method as claimed in claim 1, wherein said at least one collector element consists essentially of a packed aggregate having a mean collector element size in the range about about 0.01 to 15 cm.

7. A method as claimed in claim 6, wherein, periodically, said aggregate soiled with wax and ice crystals therein is replaced by fresh aggregate which is free of wax and ice deposits. and the soiled aggregate is supplied as feed to a catalytic conversion process.

8. A method as claimed in claim 1, wherein the free charge is introduced by flowing a stream of the wax and ice crystal-containing oil mixture past a pointed high potential electrode at sufficient velocity that free charge is injected by field emission into the wax and ice crystal-containing oil mixture and is conveyed by the flowing stream away from the high potential electrode.

9. A method as claimed in claim 1, wherein the free charge is indirectly introduced by introducing free charge into a charge carrier fluid by flowing a stream of said fluid past a pointed high potential electrode at sufficient velocity that free charge is injected by field emission into said fluid and is conveyed by the flowing stream away from the pointed electrode, and wherein the charged stream is combined with said wax and ice crystal-containing oil mixture so that the charge transfers to said crystals.

10. A method as claimed in claim 9, wherein said charge carrier fluid comprises a recycled proportion of the substantially wax and ice crystal-free oil mixture remaining after collection of said wax and ice crystals on said at least one collector element.

11. A method as claimed in claim 9, wherein said charge carrier fluid comprises an oil solvent liquid.

12. A method as claimed in claim 1, wherein the free charge is indirectly introduced by introducing free charge into a charge carrier fluid without producing ionic dissociation in that carrier fluid and by combining the charged carrier fluid with said wax and ice-crystal containing oil mixture so that the charge transfers to said crystals.

13. A method of removing haze from a feedstock of hazy hydrocarbon oil mixture boiling in the lubricating oil range, comprising the steps of:
feeding an oil solvent liquid into said feedstock;
mixing said oil solvent liquid with said hazy oil mixture to form an admixture;
reducing the temperature of said admixture to precipitate wax and water haze as wax and ice crystals and thereby form a slurry comprising solvent-diluted oil mixture containing wax and ice crystals;

injecting free charge which is net unipolar at least predominantly by field emission into a carrier fluid which is substantially devoid of any dispersed solid phase therein;

combining said charged carrier fluid and said slurry, whereby charge transfers from said carrier fluid to said wax and ice crystals; and bringing said slurry and carrier fluid into contact with a bed consisting essentially of wax in the form of packed aggregate, the wax of said aggregate being distinct from the wax crystals of said slurry, there being a sufficent excess of free charge injected as to cause wax and ice crystals to be driven to and deposited on said wax aggregate.

14. A method of removing haze from a feedstock of hazy hydrocarbon oil mixture boiling in the lubricating oil range, comprising the steps of:

feeding an oil solvent liquid into said feedstock;

mixing said oil solvent liquid with said hazy oil mixture to form an admixture;

reducing the temperature of said admixture to precipitate wax and water haze as wax and ice crystals and thereby form a slurry comprising solvent-diluted oil mixture containing wax and ice crystals;

injecting free charge which is net unipolar at least predominantly by field emission into a carrier fluid which is substantially devoid of any dispersed solid phase therein;

combining said charged carrier fluid and said slurry, whereby charge transfers from said carrier fluid to said wax and ice crystals; and bringing said slurry and carrier fluid into contact with a bed consisting solely of asphalt in the form of packed aggregate, there being a sufficient excess of free charge inejcted as to cause wax and ice crystals to be driven to and deposited on said asphalt aggregate.

15. A method of removing haze from a feedstock of hazy hydrocarbon oil mixture boiling in the lubricating oil range, comprising the steps of:

feeding an oil solvent liquid into said feedstock;

mixing said oil solvent liquid with said hazy oil mixture to form an admixture;

reducing the temperature of said admixture to precipitate wax and water haze as wax and ice crystals and thereby form a slurry comprising solvent-diluted oil mixture containing wax and ice crystals;

injecting free charge which is net unipolar at least predominantly by field emission into a carrier fluid which is substantially devoid of any dispersed solid phase therein;

combining said charged carrier fluid and said slurry, whereby charge transfers form said carrier fluid to said wax and ice crystals; and bringing said slurry and carrier fluid into contact with a bed consisting essentially of water in the solid state in the form of packed aggregate, the solid state water of said aggregate being distinct from the ice crystals of said slurry, there being a sufficient excess of free charge injected as to cause wax and ice crystals to be driven to and deposited on said aggregate of water in the solid state.

16. A method of removing haze from a feedstock of hazy hydrocarbon oil mixture boiling in the lubricating oil range, comprising the steps of:

feeding an oil solvent liquid into said feedstock;

mixing said oil solvent liquid with said hazy oil mixture to form an admixture;

reducing the temperature of said admixture sufficiently to precipitate wax and water haze as wax and ice crystals and thereby form a slurry comprising solvent-diluted oil mixture containing wax and ice crystals;

introducing free charge which is net unipolar into said slurry directly or indirectly, said free charge introduction comprising charge injection at least predominantly by field emission;

bringing said charged slurry into contact with a bed consisting essentially of one material in the form of packed aggregate, said material being selected from the group consisting of hydrocarbonaceous material and water in the solid state, but being distinct from said wax and ice crystals in said slurry, ther ebeing a sufficient excess of free charge introduced as to cause said wax and ice crystals to be driven to and deposited on said aggregate;

periodically replacing said aggregate soiled with deposited wax and ice crystals with fresh aggregate containing no deposited wax and ice crystals; and supplying the soiled aggregate as feed to a catalytic conversion process.

17. A method as claimed in claim 16, wherein the means size of the elements forming the aggregate is in the range about 0.01 cm. to about 15 cm.

18. A method as claimed in claim 17, wherein said oil solvent liquid is a vaporizable liquid which is allowed to vaporize partially to effect the temperature reduction of said admixture.

19. A method of removing haze from a hydrocarbon oil mixture boiling in the lubricating oil range, wherein at least one individual collector element consists solely of one material, said material being selected from the group consisting of hydrocarbonaceous material and water in the solid state but being distinct from said wax and ice crystals in said hydrocarbon oil mixture, is positioned in a separation region in a separator vessel, the solubility of the oil mixture for wax is reduced to precipitate at least wax crystals, free chrage which is net unipolar is introduced into the hydrocarbon oil mixture in such manner as to cause the hydrocarbon oil mixture to act as a medium through which volumetric distribution of the introduced charge takes place by free movement of charge through the hydrocarbon oil mixture, and the charged hydrocarbon oil mixture is passed into said separation region and into contact with said at least one collector element, there being a sufficient excess of free charge introduced such that the volumetric charge distribution causes wax crystals to be driven to and deposited on said at least one collector element.

20. A method as claimed in claim 19, wherein the solubility of the oil mixture for wax is reduced by admixing an oil solvent with the haze-containing oil mixture.

21. A method of removing wax and water haze from a hydrocarbon oil mixture boiling in the lubricating oil range, wherein at least one individual collector element consisting solely of one material, said material being selected from the group consisting of hydrocarbonaceous material and water in the solid state but being distinct from said wax and ice crystals in said hydrocarbon oil mixture, is positioned in a separation region in a separator vessel, the temperature of said oil mixture is reduced to precipitate crystals of wax and water in the solid state, free charge which is net unipolar is introduced into the hydrocarbon oil mixture in such manner as to cause the hydrocarbon oil mixture to act as a medium through which volumetric distribution of the introduced charge takes place by free movement of charge through the hydrocarbon oil mixture, and the charged hydrocarbon oil mixture is passed into said separation region and into contact with said at least one collector element, there being a sufficient excess of free charge introduced such that the volumetric charge distribution causes wax and ice crystals to be driven to and deposited on said at least one collector element.

22. A method as claimed in claim 21, wherein a vaporizable oil solvent in the liquid state is admixed with the haze-containing oil mixture and a proportion of said oil solvent is caused to vaporize to produce self-cooling of the admixture of oil solvent and oil mixture, so as to effect said tesolvent is caused to vaporize to produce self-cooling of the admixture of oil solvent and oil mixture, so as to effect said temperature reduction.

23. A method as claimed in claim 22, wherein said vaporizable oil solvent comprises liquid propane.

24. A method as claimed in claim 6, wherein periodically, said aggregate soled with wax and ice crystals thereon is replaced by fresh aggregate which is free of wax and ice deposits, and the soiled aggregate is processed in a combustion unit.

* * * * *